United States Patent [19]
Jarvis
[11] 3,757,255
[45] Sept. 4, 1973

[54] VARIABLE FREQUENCY REJECTION FILTER HAVING LIGHT EMITTING AND LIGHT RESPONSIVE ELEMENTS

[75] Inventor: John P. Jarvis, Northridge, Calif.
[73] Assignee: Aero Service Corporation, Philadelpha, Pa.

[22] Filed: July 19, 1972
[21] Appl. No.: 273,109

[52] U.S. Cl. ...................... 333/17, 330/59, 330/132, 333/70 R
[51] Int. Cl. ............................................. H03h 7/10
[58] Field of Search ....................... 333/17, 70 R, 18; 330/132

[56] References Cited
UNITED STATES PATENTS

| | | | |
|---|---|---|---|
| 2,606,972 | 8/1952 | Scott | 333/70 R X |
| 3,281;723 | 10/1966 | Mercer | 333/18 |
| 3,327,210 | 6/1967 | Wu | 333/70 R X |
| 3,562,675 | 2/1971 | Urell | 333/17 |

*Primary Examiner*—Paul L. Gensler
*Attorney*—Robert M. Angus et al.

[57] ABSTRACT

A variable frequency rejection filter is provided with an input adapted to be connected to a signal source and an output. A plurality of individual filters are provided, each having a tuned circuit tuned to a different center frequency. Each of the individual filters includes first and second impedance means connected between the input and the output. The tuned circuits are connected to the junction between the first and second impedance means. One of the impedance means is a variable impedance means, such as a radiation responsive resistor, and control means is provided which is responsive to a particular signal frequency to selectively control the impedance of one of the variable impedance means. For ecample, the control means may include a light emitting diode which emits radiation to impinge upon a respective radiation responsive resistor.

18 Claims, 9 Drawing Figures

Figure 1:
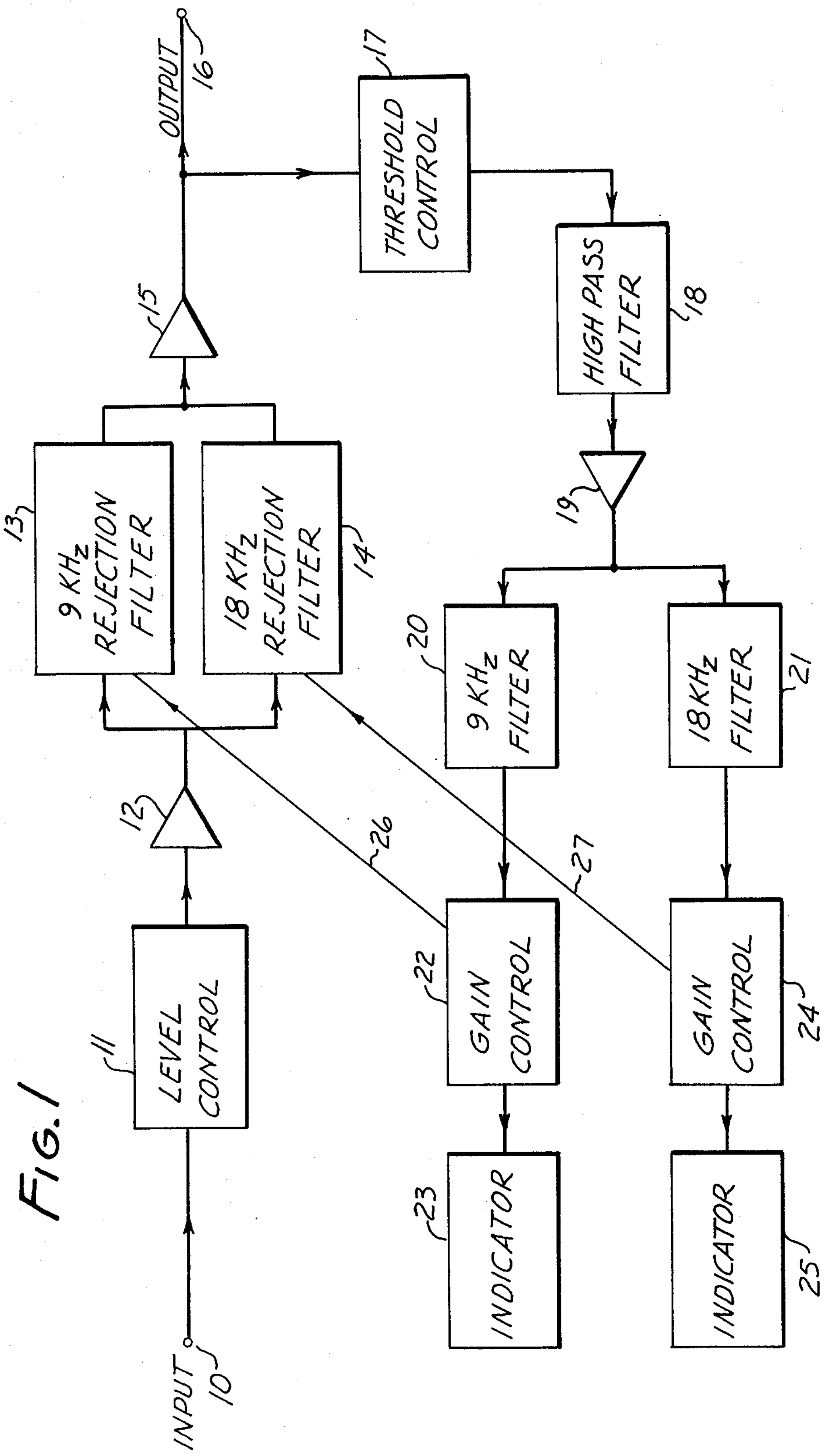

VARIABLE FREQUENCY REJECTION FILTER HAVING LIGHT EMITTING AND LIGHT RESPONSIVE ELEMENTS

This invention relates to variable frequency filters and particularly to variable bandwidth, variable frequency filters for reducing gain at high frequencies.

In recent years there has been a trend toward increasing the recording levels at which disc recordings are recorded. Recent developments in the disc recording technology has resulted in apparatus for driving disc cutting styluses which requires minimal power, particularly at frequencies in the upper regions of the audio range (7 to 25 KHz). For example, in the copending application of Otto F. Hepp and John P. Jarvis, U.S. Pat. No. 248,542, filed Apr. 28, 1972 for "Improvements In Disc Recording Apparatus" and assigned to the same assignee as the present invention, there is disclosed apparatus for driving a disc recording stylus which includes a drive winding having a low impedance for greater response at higher frequencies.

As a result of the advances in the technology, and particularly the increased response at higher frequencies, and as a result of the trend toward increased recording levels, there exists a greater likelihood of distortion in disc recordings at higher frequencies due to over-driving the stylus at higher frequencies which causes excessive high-frequency groove modulation. As a result, a need has arisen for apparatus for reducing the level of high frequency signals to minimize distortion.

The present invention relates to a gain reduction amplifier for reducing the gain of signals at higher frequencies, particularly at higher frequencies in the audio range. By reducing the high frequency power delivered to the stylus driving apparatus, the risk of excessive high frequency groove modulation and the attendant disc over-cutting is substantially reduced, thereby preventing damage to the recording and to the disc recorder.

It is an object of the present invention to provide apparatus for automatically suppressing signal amplitudes of signals in upper frequency ranges whenever the energy of each signals exceeds a predetermined level.

It is another object of the present invention to provide a rejection filter network capable of automatically suppressing the amplitudes of signals in the upper frequency range of the audio spectrum whenever the energy content of source material in that range exceeds a predetermined level.

It is another object of the present invention to provide a variable bandwidth, variable frequency rejection filter capable of variable rejection characteristics so that the center frequency of rejection is approximately the same as the frequency of an offensive signal and whose bandwidth is variable about the center frequency.

In accordance with the present invention a filter is provided connected between a signal source and an output. The filter comprises a plurality of individual filter circuits each having a tuned circuit tuned to an individual center frequency. The tuned circuit of each filter circuit is connected to the junction between respective first and second impedance means connected between the input and output of the apparatus, one of the impedance means being a variable impedance. Control means, responsive to signals, operates on the variable impedance to selectively vary the impedance in accordance with the amplitude and frequency of the output signal.

One feature of the invention resides in the provision of a radiation producing device in the control means, the control means being responsive to signal inputs in the range of offending signal frequencies to vary the output of the radiation producing device. The variable impedance means is responsive to radiation from the radiation producing device to alter its impedance characteristics.

Figure 2A:
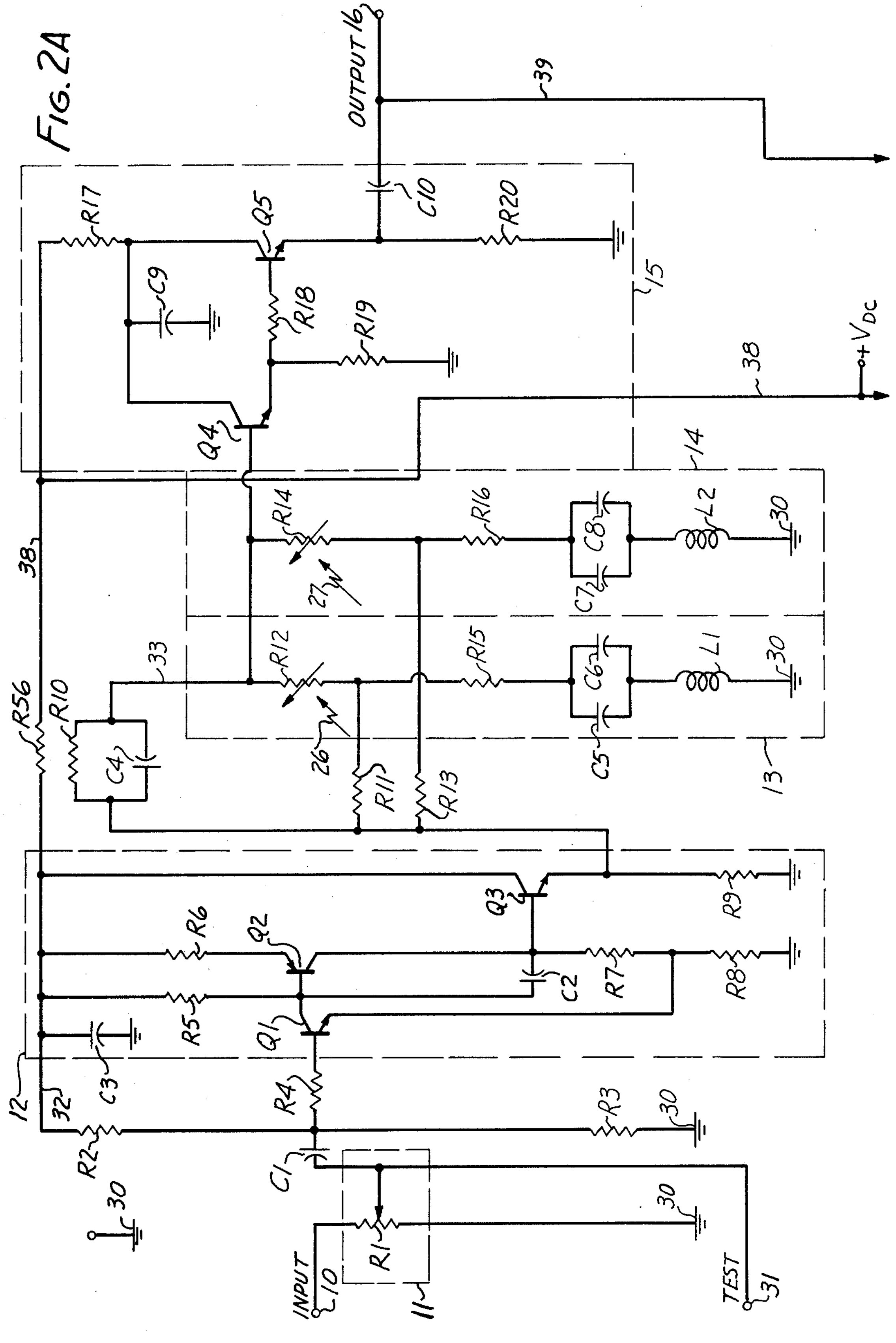
Figure 2B:
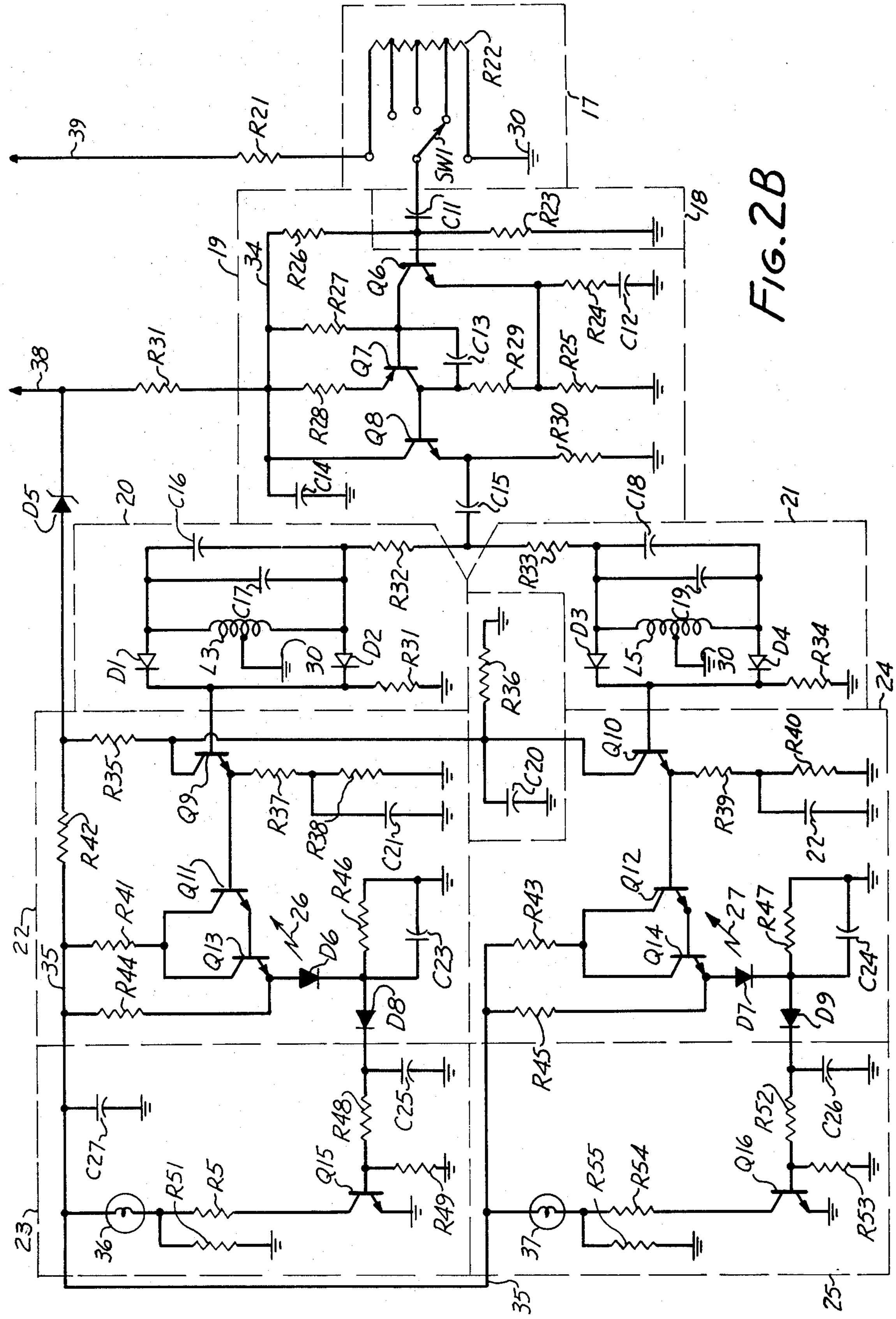
Figure 3A:
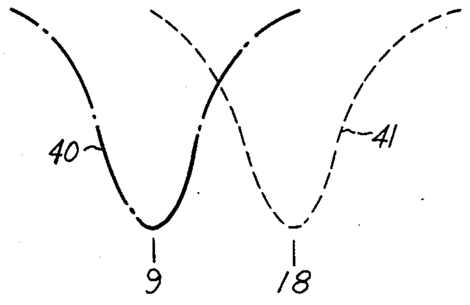
Figure 4A:
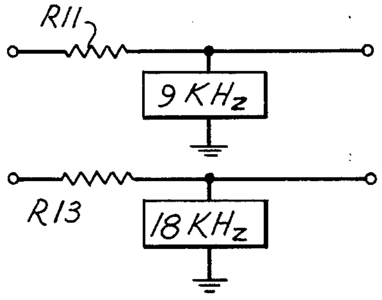
Figure 3B:
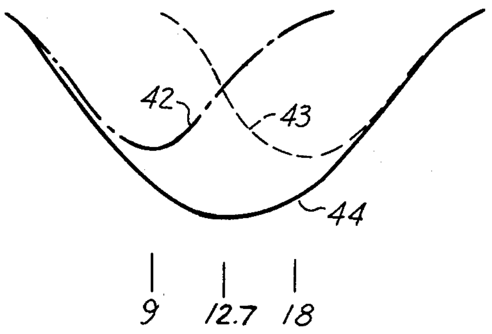
Figure 4B:
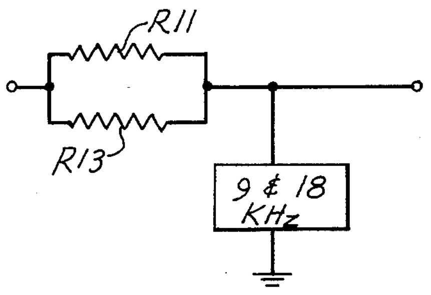
Figure 3C:
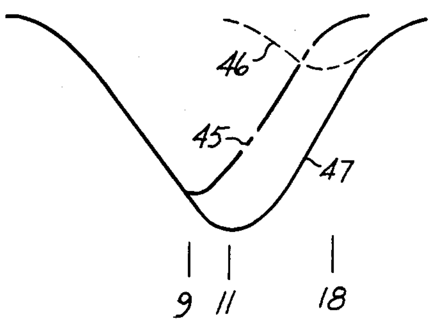
Figure 4C:
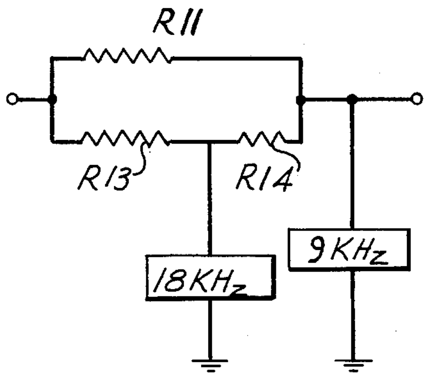

The above and other features of this invention will be more fully understood from the following detailed description and the accompanying drawings, in which:

FIG. 1 is a block circuit diagram of a gain reduction apparatus in accordance with the presently preferred embodiment of the present invention;

FIGS. 2A and 2B, taken together, illustrate a circuit diagram of the apparatus illustrated in FIG. 1;

FIGS. 3A–3C are diagrams illustrating the principles of operation of the apparatus illustrated in FIGS. 1 and 2; and FIGS. 4A–4C are simplified block-circuit diagrams for explaining the operation of the apparatus illustrated in FIGS. 1 and 2.

With reference to FIG. 1, there is illustrated a block circuit diagram of a high frequency gain reduction amplifier in accordance with the presently preferred embodiment of the present invention. An input terminal 10 is adapted to be connected to an input signal source (not shown) to provide an input to level control 11. Level control 11 provides an output to amplifier 12 which provides outputs to each of rejection filters 13 and 14. The outputs from filters 13 and 14 are connected through amplifier 15 to output terminal 16. Also, the output from amplifier 15 is connected through threshold control circuit 17 to highpass filter 18 which passes high frequency signals. The output from filter 18 is connected through amplifier 19 to bandpass filters 20 and 21. The out-put from filter 20 is connected through gain control circuit 22 to indicator circuit 23, and the output from filter 21 is connected through gain control circuit 24 to indicator circuit 25. Gain control circuit 22 provides an input, shown at 26 to rejection filter 13, and gain control 24 provides an input shown at 27 to rejection filter 14.

FIGS. 2A and 2B, taken together, depict a circuit diagram of the apparatus illustrated in FIG. 1. Input terminal 10 is connected to one side of a variable resistor R1 which forms level control circuit 11. The opposite side of resistor R1 is connected to ground 30. The center tap of resistor R1 is connected through capacitor C1 to the junction beween resistors R2 and R3. Preferably, a suitable test terminal 31 is connected to the center tap of resistor R1. Resistors R2 and R3 are connected in series between lead 32 and ground. Lead 32 is connected through resistor R56 to lead 38 which is connected to a suitable source of positive DC voltage, such as +65 volts. The junction between resistors R2 and R3 is connected through resistor R4 to the input of amplifier 12.

Amplifier 12 comprises a first npn transistor Q1 having its base connected to resistor R4 and having its collector connected to the base of pnp transistor Q2. The base of transistor Q2 is connected through resistor R5 to lead 32 and the emitter of transistor Q2 is connected through resistor R6 to lead 32. The collector of transistor Q2 is connected through resistors R7 and R8 to ground 30, and the emitter of transistor Q1 is connected to the junction between resistors R7 and R8. Capacitor C2 is connected between the base and collector of transistor Q2. Capacitor C3 is connected between lead 32 and ground. The collector of transistor Q2 is connected to the base of npn transistor Q3 whose collector is connected directly to lead 32 and whose emitter is connected through resistor R9 to ground. The output from transistor Q3 is taken via its emitter through an RC circuit consisting of resistor R10 and capacitor C4 connected in parallel to lead 33.

Resistors R11 and R12 are connected in series between lead 33 and the emitter of transistor Q3 and resistors R13 and R14 are connected in series between lead 33 and transistor Q3. As will more fully understood hereinafer, resistors R12 and R14 are light dependent variable resistors whose impedance decreases with increasing incident light radiation.

Rejection filter 13 includes resistor R12 together with resistor R15 which is connected to the junction between resistors R11 and R12. Capacitors C5 and C6 are connected in parallel between the opposite side of resistor R15 and inductor L1. The opposite side of inductor L1 is connected to ground 30. Capacitors C5 and C6 and inductor L1 are tuned to shunt a 9 KHz signal to ground. Rejection filter 14 comprises resistor R14 and resistor R16 which is connected to the junction between resistors R13 and R14. Capacitors C7 and C8 are connected in parallel between resistor R16 and inductor L2. The opposite side of inductor L2 is connected to ground 30. Capacitors C7 and C8 and inductor L2 are adjusted to shunt an 18 KHz signal to ground.

As shown in FIG. 2A, rejection filters 13 and 14 are connected between lead 33 and ground 30. Thus, lead 33 provides a combined output from the rejection filters to amplifier 15.

Amplifier 15 comprises npn transistor Q4 having its base connected to lead 33 and having its collector connected through resistor R17 to lead 38. The emitter of transistor Q4 is connected through resistor R18 to the base of npn transistor Q5 whose collector is connected directly to collector of transistor Q4. The emitter of transistor Q4 is also connected through resistor R19 to ground 30, and the emitter of transistor Q5 is connected through resistor R20 to ground 30. Preferably, the collectors of transistors Q5 and Q6 are connected through capacitor C9 to ground 30. The emitter of transistor Q5 is connected through capacitor C10 to output terminal 16 connected to lead 39.

With reference particularly to FIG. 2B, threshold control circuit 17 is connected to lead 39 through resistor R21. Threshold control circuit 17 may comprise a multi-contact switch SW1 having a moveable contact and a plurality of individual contacts each connected to a separate tap of resistor R22. By way of example, resistor R22 may be connected between the end contacts of switch SW1 between resistor R21 and ground 30, and the other contacts may be appropriately tapped to resistor R22. Although as shown as a multi-position rotary switch, it is understood that switch SW1 may comprise any suitable switch arrangement, such as a plurality of push-button switches connected to suitable resistors R22 connected in series between resistor R21 and ground 30.

The moveable contact of switch SW1 is connected to the input of high frequency bandpass filter 18 which includes a capacitor C11 connected to the moveable contact of switch SW1. Resistor R23 is connected between the base of npn transistor Q6 of amplifier 19 and ground 30. Capacitor C11 and resistor R23 form a low frequency de-emphasis circuit which attenuates signals at 6db per octave so that greater attenuation occurs at lower frequencies than at higher frequency throughout the audio range (e.g. 20 to 20,000 Hz).

The collector of transistor Q6 is connected to the base of pnp transistor Q7 and the emitter of transistor Q6 is connected through resistor R24 and capacitor C12 to ground. Capacitor C12 and resistor R24 provide for a substantially uniform frequency response for amplifier 19. The emitter of transistor Q6 is connected through resistor R25 to ground, and the base of transistor Q6 is connected through resistor R26 to lead 34. The collector of transistor Q6 is connected through resistor R27 to lead 34. The emitter of transistor Q7 is connected through resistor R28 to lead 34. Capacitor C13 is connected between the collector and base of transistor Q7. The collector of transistor Q7 is connected through resistor R29 to the emitter of transistor Q6 and to the base of npn transistor Q8. The emitter of transistor Q8 is connected through resistor R30 to ground, and the collector of transistor Q8 is connected to lead 34, in which in turn is connected through capacitor C14 to ground. Lead 34 is connected through resistor R31 to lead 38.

The output from amplifier 19 is connected via capacitor C15 to the inputs of filters 20 and 21. Filter 20 comprises a pair of capacitors C16 and C17 connected in parallel across inductor L3. The center top of inductor L3 is connected directly to ground. Capacitors C16 and C17 with inductor L3 are tuned in an L-C arrangement to a 9 KHz center frequency. Both sides of the parallel circuit arrangement are connected through respective diodes D1 and D2 to the base of npn transistor Q9 in gain control circuit 22. Likewise, the diodes are connected through resistor R31 to ground. The input for the parallel arrangement is connected to capacitor C15 through resistor R32. The bandwidth characteristics of filter 20 are determined by the L-C arrangement as well as by the input impedance established in part by amplifier 19 and resistor R32.

Similarly, filter 21 comprises a pair of capacitors C18 and C19 connected in parallel across inductor L5. The center top of inductor L5 is connected directly to ground. The input for the parallel arrangement of the capacitors and inductors is connected via resistor R33 to capacitor C15, and the output from the filter is connected via diodes D3 and D4 to the base of npn transistor Q10 in gain control circuit 24. The output from the diodes is also connected via resistor R34 to ground. The values of capacitors C18 and C19 and inductor L5 are selected so that the filter arrangement of filter 21 is tuned to pass an 18 KHz signal center frequency with predetermined bandwidth characteristics.

The collectors of transistors Q9 and Q10 are connected together and through resistor R35 to the anode of Zener diode D5. The cathode of Zener diode D5 is connected to lead 38. Also, the collectors of transistors Q9 and Q10 are connected through resistor R36 and capacitor C20 to ground. The emitter of transistor of Q9 is connected through resistor R37 to capacitor C21 and resistor R38 connected in parallel to ground 30.

Likewise, the emitter of transistor Q10 is connected through resistor R39 to capacitor C22 and resistor R40 connected in parallel to the ground. The emitter of transistor Q9 is also connected to the base of npn transistor Q11, while the emitter of transistor Q10 is connected to the base of npn transistor Q12. The collector of transistor Q11 is connected to the collector of transistor npn transistor Q13 and through resistor R41 to lead 35. Lead 35 is connected to the anode of Zener diode D5 through resistor R42. Likewise, the collector of transistor Q12 is connected to the collector of npn transistor Q14 and through resistor R43 to lead 35. The emitter of transistor Q13 is connected through resistor R44 to lead 35 and the emitter of transistor Q14 is connected through resistor R45 to lead 35.

The emitter of transistor Q13 is connected through light emitting diode D6 to an RC filter consisting of resistor R46 and capacitor C23. Likewise, the output from the emitter transistor Q14 is connected through light emitting diode D7 to the RC filter consisting of resistor R47 and capacitor C24. Light emitting diode D6 is operatively associated with light dependent resistor R12 via a line-of-sight radiation path shown generally at 26. Likewise, light emitting diode D7 is operatively associated with light dependent resistor R14 via a line-of-sight radiation path shown generally at 27. Light emitting diodes D6 and D7 are each of the class which emit radiation proportional to the amplitude of current passing through the respective diode.

The cathode of diode D6 is connected through diode D8 to indicator circuit 23, and the cathode of diode D7 is connected through diode D8 to indicator circuit 25. Indicator circuit 23 includes a capacitor C25 connected between the cathode of diode D8 and ground. Resistor R48 is connected between the cathode of diode D8 and the base of npn transistor Q15. The base of transistor Q15 is also connected to ground via resistor R49. The emitter of transistor Q15 is connected to ground and the collector of transistor Q15 is connected via resistor R50 to Lamp 36. The opposite side of Lamp 36 is connected to lead 35. Resistor R51 is connected between ground and the junction of resistor R50 and lamp 36.

Similarly, indicator circuit 25 includes a capacitor C26 connected between the cathode of diode D9 and ground. Resistor R52 is connected between the cathode of diode D9 and the base of npn transistor Q16. The base of transistor 16 is also referenced to ground through resistor R53. The emitter of transistor Q16 is connected to ground and the collector of transistor Q16 is connected through resistor R54 to lamp 37. The opposite side of lamp 37 is connected to lead 35. Resistor R55 is connected between ground and the junction of resistor R54 and lamp 37. Preferably, storage capacitor C27 is connected between lead 35 and ground to regulate the voltage on lead 35.

In operation of the apparatus, a program signal is applied to input terminal 10. Resistor R1 is adjusted to a suitable level control so that the input signal is applied to amplifier 12 for amplification. The amplified signal is forwarded to filters 13 and 14 from the emitter of transistor Q3.

The input signal may include one or more frequencies. For example, if the signal source connected to terminal 10 is a voice or music signal source, the input signal may include subsignals having various frequencies below about 25 KHz. Further, it may be desirable to suppress signals above about 7 KHz.

Filters 13 and 14 are variable bandwidth filters having center frequencies at 9 KHz and 18 KHz, respectively. Working together, filters 13 and 14 will exhibit a rejection characteristic having a center frequency variable between 9 KHz and 18 KHz and having a variable bandwidth. The R-L-C network consisting of resistor R15, capacitors C5 and C6 and inductor L1 is tuned to 9 KHz, and the R-L-C network consisting of resistor R16, capacitors C7 and C8 and inductor L2 is tuned to 18 KHz.

There are three possible paths for program signals to pass between the output of amplifier 12 and the input of amplifier 15. These three paths are (1) the RC network consisting of resistor R10 and capacitor C4, (2) the impedance path including resistors R11 and R12 together with the series resonant L-C network of filter 13, and (3) the impedance path consisting of resistors R13 and R14 together with the series resonant L-C network of filter 14. The circuit path including resistor R10 and capacitor C4 passes a portion of the signals over the entire frequency range of signals to be passed between amplifiers 12 and 15, such as over the entire audio frequency range, with a substantially flat or constant amplitude response over the entire frequency range. The circuit path including filter 13, however, will suppress signals in the bandwidth of the 9 KHz filter, and the circuit path including filter 14 will suppress signals in the bandwidth of the 18 KHz filter. The degree of transmission of signals through the three circuit paths will depend upon the instantaneous relative impedance values of the circuit paths. The signals passing between the output of amplifier 12 and the input of amplifier 15 are divided between the three circuit paths in relationship to the relative impedance of each of the circuit paths. Thus, a greater portion of the signal will pass through that circuit path with the lowest impedance.

The series resonant LC network of each filter 13 and 14 is tuned to shunt to ground that portion of the signal lying within the bandpath region of the respective filter 13 and 14. As a result, the circuit paths including filters 13 and 14 will each exhibit rejection characteristics such that signals having frequencies within the respective band regions of filters 13 and 14 are suppressed. The over-all effect of the suppression of signals passing through the circuit paths including filters 13 and 14, in parallel with the circuit path including resistor R10 and capacitor C4, is such that the degree of suppression of signals is dependent upon the relative impedance values of the various circuit paths. Thus, if resistor R12 is reduced to some minimal value such that the combined impedance of resistors R11 and R12 is significantly smaller than the combined impedance of resistors R13 and R14 and the combined impedance of resistor R10 and capacitor C4, the program signal will be unequally divided between the three circuit paths such that a greater portion of the signal will pass through resistor R11. Signal frequencies in the bandwidth of the resonant L-C network are shunted to ground, so only the remaining portion of the signal passed by resistor R11 is passed through resistor R12 to amplifier 15. It is evident, under this condition, that a major portion of the signal frequencies in the bandwidth of the 9 KHz filter are suppressed, while only a small portion of the signal frequencies in the bandwidth of the 18 KHz filter is suppressed. Thus, a small portion of the 9 KHz signal is passed through the circuit path including resistor R10 and C4 while a major portion of such signal is suppressed through the L-C network of filter 13. Conversely, if resistor R14 is reduced to some minimum value, 18 KHz signals will be suppressed via the L-C network of filter 14, with only a small portion of such signals being passed through the circuit path including resistor R10 and capacitor C4.

Resistors R12 and R14 are light-dependent resistors whose impedance values vary inversely with respect to incident radiation from diodes D6 and D7, respectively. As heretofore explained, diode D6 emits greater radiation when a strong signal is present in the bandwidth of the 9 KHz filter 20, while diode D7 emits greater radiation when a strong signal is present in the bandwidth of the 18 KHz filter 21. Thus, if a strong 9 KHz signal operates diode D6 to reduce the impedance of resistor R12, a greater portion of the incoming signal is passed through resistor R11 to shunt a greater portion of 9 KHz signals to ground, thereby suppressing 9 KHz signals. Likewise, if a strong 18 KHz signal operates diode D7 to reduce the impedance of resistor R14, a greater portion of the incoming signal is passed through resistor R13 to shunt a greater portion of 18 KHz signals to ground to suppress 18 KHz signals.

With reference to FIGS. 3A and 4A, the effect of a strong 9 KHz and a strong 18 KHz signal may be explained. Considering first the case of a strong 9 KHz signal, the program signal which includes the strong 9 KHz signal is divided through the three circuit paths between amplifiers 12 and 15. A portion of the 9 KHz signals is passed through the circuit path consisting of resistor R10 and capacitor C4 through control 17 and filter 18 to operate diode D6 through filter 20 to emit relatively strong radiation. Radiation from diode D6 impinges on resistor R12 to reduce the impedance of resistor R12 to some minimal value so that the circuit path containing filter 13 has an impedance approximately equal to the impedance of resistor R11. As a result, a greater portion of the program signal is passed through resistor R11 so that a greater portion of the offending 9 KHz signal is suppressed by the L-C network of filter 13. A small portion of the program signal, including the offending 9 KHz signal, continues to be passed through the other two circuit paths to operate diode D6. The rejection notch of signals appearing at the input of amplifier 15 is shown as waveform 40 in FIG. 3A. Likewise, if the program signal contains a strong 18 KHz signal, the circuit will exhibit a rejection notch shown as waveform 41 in FIG. 3A. Thus, a 9 KHz or an 18 KHz signal is suppressed to a substantial degree by virtue of the fact that the circuit path carrying the major portion of such an offending signal shunts those signals to ground.

With reference to FIGS. 3B and 4B, the effect of a strong 12.7 KHz signal may be explained. In this case, the program signal containing the 12.7 KHz signal frequency is divided through the three circuit paths so that a portion of the signal is fed to the inputs of both filters 20 and 21. The 12.7 KHz signal, being at the approximate logarithmic midpoint between 9 KHz and 18 KHz, is passed approximately equally by filters 20 and 21 to operate diodes D6 and D7 approximately equally. (The signal is divided approximately equally due to the fact that each filter 20 and 21 has a bandwidth centered at 9 KHz and 18 KHz with less signal passed at signals off the center frequency in logarithmic relative to the frequency as is the bandpass characteristic of any typical bandpass filter. Since 12.7 KHz is logarithmically halfway between 9 KHz and 18 KHz, the signal frequency lies at about equal points of the frequency vs. attenuation curve of both filters.) Diodes D6 and D7 emit radiation which impinges on resistors R12 and R14 to reduce their respective impedance values to a nearly minimum value. As a result, the L-C networks of both filters 13 and 14 are substantially in parallel between the input to amplifier 15 and ground. Further, resistors R11 and R13 are substantially in parallel between amplifiers 12 and 15.

As a result of the parallel arrangement of resistors R11 and R13, as diagrammatically shown in FIGS. 4B, a major portion of the program signal is passed through the resistors R11 and R13. The offending 12.7 KHz signal, being within the bandwidth of both filters 13 and 14, is partially shunted to ground through the L-C networks of both filters 13 and 14. Thus, and with reference to FIG. 3B, filter 13 will exhibit rejection characteristics as shown by waveform 42, while filter 14 will exhibit rejection characteristics as shown by waveform 43. The net result is that the program signals passing through resistors R11 and R13 will be suppressed in accordance with waveform 44, centered at about 12.7 KHz.

Likewise other signal frequencies in the range between 9 KHz and 18 KHz will be suppressed. Thus, and as shown particularly in FIGS. 3C and 4C, an 11 KHz signal, being logarithmically closer to 9 KHz than 18 KHz, will be passed unequally by filters 20 and 21 to operate diode D6 more strongly than diode D7. As a result a greater portion of the program signal containing a strong 11 KHz frequency will be passed by resistor R11. Thus, the L-C network of the 9 KHz filter 13 will receive signals via resistor R13 in parallel with the series arrangement of resistors R13 and R14 (see FIG. 4C). Filter 13 will exhibit rejection characteristics as shown by waveform 45 while filter 14 will exhibit rejection characteristics shown by waveform 46, thereby suppressing signals in accordance with waveform 47, centered at about 11 KHz.

In the use of the apparatus according to the present invention, a program source containing material to be recorded is applied to input terminal 10. Level control 11 is adjusted to a predetermined recording level and the program material is amplified by amplifier 12 and provided as an output from transistor Q3 (FIG. 2A). The signals of the program material are divided through three parallel paths, two of the paths including filters 13 and 14, and a third path consisting of the parallel RC network consisting of resistor R10 and capacitor C4. Program signals are forwarded through the three circuit paths in relation to the impedance of the paths to amplifier 15, and thence to output 16. A portion of the signals supplied to output 16 are forwarded through threshold circuit 17 which is adjusted to pass signals having amplitudes above a predetermined level. The signals passed by circuit 17 are filtered by filter 18 to remove lower frequency signals and thereafter operate on filters 20 and 21 to control diodes D6 and D7 in the manner heretofore described, thereby controlling the impedances of the circuit paths of filters 13 and 14, as heretofore described.

One feature of the present invention resides in the fact that high pass filter 18 attenuates signals supplied to it at the rate of about 6*db* per octave so that the filter 18 passes signals at high frequencies with minimal attenuation while signals in lower frequency ranges are more greatly attenuated, as heretofore explained. As a result, higher frequency signals, such as 18 KHz signals, are passed with less attenuation than lower frequency signals, for example 9 KHz signals, to more strongly operate the associated diodes, thereby providing greater rejection characteristics at higher frequencies. Thus, for a given signal amplitude to the input of filter 18, a greater portion of the amplitude will be forwarded to amplifier 19 for 18 KHz signals than for 9 KHz signals. As a result, diode D7 will be more strongly energized by an 18 KHz signal of given amplitude at output 16 than diode D6 would be for a 9 KHz signal of the same amplitude, due to the fact that the 9 KHz signal is attenuated by filter 18 more than the 18 KHz signal. Thus, if the program signal contains both 9 KHz and 18 KHz signal frequencies at about equal amplitudes, the 9 KHz signal will be more greatly attenuated by filter 18, thereby energizing diode D6 less strongly than diode D7. Hence, resistors R12 and R14 are unequally operated, thereby resulting in greater suppression of higher frequency, e.g., 18 KHz, signals. The attenuation characteristics of filter 18 in accordance with the logarithm of the signal frequency so that the net suppression characteristics of the three circuit paths between amplifiers 12 and 15 is in accordance with the logarithm of the frequency of the program signal.

The present invention thus provides a variable frequency rejection filter and high frequency gain reduction amplifier for recording equipment capable of suppressing the amplitudes of higher frequency signals in the audio range. Quite obviously, although only two rejection filters are shown in connection with the description of the invention, additional rejection filters may be placed in parallel with filters 13 and 14 for more precise rejection characteristics over a greater frequency range. Although the invention has been described in connection with suppression of higher frequency signals in the audio range, it is evident that the invention is also applicable to rejection of signals in any desired frequency range.

The apparatus is effective in operation, and responds to high frequency audio signals within about one-quarter cycle. Indicators 23 and 25 provide a visual indication of the operation of the apparatus so that an operator may determine the extent of suppression of signals.

This invention is not to be limited by the embodiment shown in the drawings and described in the description, which is given by way of example and not of limitation, but only in accordance with the appended claims.

What is claimed is:

1. A filter network comprising, in combination, an input adapted to be connected to a signal source; an output; a first circuit path including first impedance means and second variable impedance means connected in series between said input and said output, and a first tuned circuit connected between a reference potential and the junction between said first and second impedance means, said first tuned circuit being tuned to a first center frequency; a second circuit path including third impedance means and fourth variable impedance means connected in series between said input and said output and in parallel with the series connection including said first and second impedance means, and a second tuned circuit connected between said reference potential and the junction between said third and fourth impedance means, second tuned circuit being tuned to a second center frequency different from said first center frequency, said second and fourth variable impedance means each being responsive to incident radiation to vary their respective impedances to a level inversely proportional to the level of such incident radiation; first bandpass filter means connected to said output for passing signals within a first predetermined bandwidth centered at said first center frequency; second bandpass filter means connected to said output for passing signals within a second predetermined bandwidth centered at said second center frequency; first radiation emitting means for emitting radiation having an intensity proportional to the amplitude of signals passed by said first bandpass filter means; and second radiation emitting means for emitting radiation having an intensity proportional to the amplitude of signals passed by said second bandpass filter means, said first and second radiation emitting means being so disposed and arranged with respect to said second and fourth impedance means that radiation emitted by said first radiation emitting means impinges said second impedance means and radiation emitted by said second radiation emitting means impinges said fourth impedance means.

2. Apparatus according to claim 1 wherein said first and third impedance means are resistors and said second and fourth impedance means are light dependent resistors, said first and second radiation emitting means each being light emitting diodes.

3. Apparatus according to claim 1 further including indicator means connected to each of said first and second bandpass filter means for indicating operation of the respective radiation emitting means.

4. Apparatus according to claim 1 further including threshold control means connected between said output and said first and second bandpass filter means for selectively controlling the amplitude of signals applied to said first and second bandpass filter means.

5. Apparatus according to claim 1 further including a third circuit path between said input and output for passing signals from said signal source to said output.

6. Apparatus according to claim 5 wherein said first center frequency is of the order of about 9 KHz and said second center frequency is of the order of about 18 KHz.

7. Apparatus according to claim 5 further including indicator means connected to each of said first and second bandpass filter means for indicating operation of the respective radiation emitting means.

8. Apparatus according to claim 5 wherein said first and third impedance means are resistors and said second and fourth impedance means are light dependent resistors, said first and second radiation emitting means each being light emitting diodes.

9. Apparatus according to claim 5 further including threshold control means connected between said output and said first and second bandpass filter means for selectively controlling the amplitude of signals applied to said first and second bandpass filter means.

10. Apparatus according to claim 9 further including means for selectively attenuating the amplitude of signals from said threshold means in such a manner that lower frequency signal amplitudes are attenuated more than higher frequency signal amplitudes.

11. A rejection filter comprising, in combination, an input adapted to be connected to a signal source and an output; a plurality of circuit paths each including a first impedance means and a second variable impedance means connected in series between said input and said output, and a tuned circuit connected to the junction between said first and second impedance means, each of said tuned circuits being tuned to a different center frequency; and a plurality of control means connected to said output, each of said control means being responsive to a signal having a frequency within a bandwidth centered at respectively different center frequencies to selectively vary the impedance of a respective one of said second impedance means.

12. Apparatus according to claim 11 further including additional circuit path connected between said input and output to pass signals from said signal source to said output.

13. Apparatus according to claim 11 wherein each of said control means comprises a bandpass filter means connected to said output, each of said bandpass filter means being tuned to a different center frequency and having a bandwidth such that signals having frequencies within the bandwidth of a respective bandpass filter means are passed by the respective bandpass filter means, signal producing means connected to each of said bandpass filter means for producing a signal having an amplitude proportional to the amplitude of the signal passed by the respective bandpass filter means, and a plurality of regulator means responsive to individual ones of the signals produced by said signal producing means for varying the impedance of respective ones of said second impedance means, each of said regulator means controlling the impedance of the respective second impedance means to a magnitude inversely proportional to the amplitude of the signal produced by the respective sense means.

14. Apparatus according to claim 13 further including indicator means connected to each of said sense means for indicating operation of said sense means.

15. Apparatus according to claim 13 wherein each of said first impedance means is a fixed resistor and each of said second impedance means is a radiation responsive resistor whose resistance value is inversely proportional to the intensity of incident radiation, each of said regulator means comprising a radiation producing means for emitting radiation having an intensity proportional to the amplitude of the signal produced by the respective signal producing means, each of said radiation producing means being operatively associated with a respective radiation responsive resistor to direct radiation to said radiation responsive resistor.

16. Apparatus according to claim 15 wherein each of said radiation responsive resistors in a light dependent resistor and each of said radiation producing means is a light emitting diode.

17. The method of suppressing signals in a predetermined frequency range comprising the steps of dividing an input signal containing signal frequencies to be suppressed between a plurality of circuit paths between an input and an output of a circuit, each of said circuit paths including first and second impedances arranged in series between said input and said output and a tuned circuit connected to the junction between said first and second impedances to shunt signal frequencies to be suppressed, each of said tuned circuits being tuned to a different center frequency;

responding to the signal appearing at the output to reduce the impedance characteristics of the second impedance in each circuit path by an amount inversely proportional to the difference between the logarithm of the center frequency of the respective tuned circuit and the frequency of the signal appearing at the output so that the impedance of the one circuit path containing the tuned circuit tuned to the center frequency logarithmically closest to the signal appearing at the output is the smallest so that a substantial portion of the input signal passes through said one circuit path thereby shunting a substantial portion of the signal frequencies to be suppressed through the respective tuned circuit.

18. The method according to claim 17 further including applying the input signal to an additional circuit path between the input and the output to pass at least a portion of the input signal to said output.

* * * * *

UNITED STATES PATENT OFFICE
CERTIFICATE OF CORRECTION

Patent No. 3,757,255 Dated September 4, 1973

Inventor(s) John P. Jarvis

It is certified that error appears in the above-identified patent and that said Letters Patent are hereby corrected as shown below:

In the abstract:

At three lines from the bottom, the word "ecample" should read -- example --. Column 1, line 15, "U.S. Pat." should read -- Serial --.

Signed and sealed this 26th day of March 1974.

(SEAL)
Attest:

EDWARD M.FLETCHER,JR.
Attesting Officer

C. MARSHALL DANN
Commissioner of Patents

ORM PO-1050 (10-69)

USCOMM-DC 60376-P69
☆ U.S. GOVERNMENT PRINTING OFFICE : 1969 O—366-334.

14